US012187896B2

(12) United States Patent
Tibah

(10) Patent No.: US 12,187,896 B2
(45) Date of Patent: *Jan. 7, 2025

(54) COMPATIBILIZER PRECURSOR, METHODS, SYSTEMS, AND USES THEREOF, AND FORMULATIONS INCLUDING THE SAME

(71) Applicant: BMIC LLC, Dallas, TX (US)

(72) Inventor: Denis Muki Tibah, Waxahachie, TX (US)

(73) Assignee: BMIC LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,398

(22) Filed: Mar. 20, 2023

(65) Prior Publication Data
US 2023/0235175 A1 Jul. 27, 2023

Related U.S. Application Data

(63) Continuation of application No. 17/112,489, filed on Dec. 4, 2020, now Pat. No. 11,634,585.

(60) Provisional application No. 63/032,960, filed on Jun. 1, 2020, provisional application No. 62/944,727, filed on Dec. 6, 2019.

(51) Int. Cl.
*C08L 95/00* (2006.01)
*C08L 91/00* (2006.01)

(52) U.S. Cl.
CPC ............... *C08L 95/00* (2013.01); *C08L 91/00* (2013.01); *C08L 2205/035* (2013.01)

(58) Field of Classification Search
CPC .... C08L 95/00; C08L 91/00; C08L 2205/035; C08L 17/00; C08L 93/04; C09D 195/00
See application file for complete search history.

(56) References Cited

U.S. PATENT DOCUMENTS

| 6,143,812 A | 11/2000 | Martin et al. |
| 6,451,886 B1 | 9/2002 | Krivohlavek et al. |
| 10,801,168 B2 | 10/2020 | Fasula et al. |
| 2016/0347953 A1 | 10/2016 | Loup |
| 2018/0112074 A1 | 4/2018 | Tibah |
| 2018/0148575 A1 | 5/2018 | Kurth et al. |
| 2020/0040186 A1 | 2/2020 | Kim |

(Continued)

FOREIGN PATENT DOCUMENTS

| GB | 2195642 A | 4/1988 |
| KR | 2014-0084729 A | 7/2014 |
| KR | 10-1804391 B1 | 11/2017 |

OTHER PUBLICATIONS

European Search Report issued in corresponding European Application No. 20895295.2 dated Feb. 29, 2024.

(Continued)

*Primary Examiner* — Ellen M McAvoy
(74) *Attorney, Agent, or Firm* — Venable LLP

(57) ABSTRACT

Some embodiments of the present disclosure relate to a method comprising mixing at least one compatibilizer precursor with at least one polymer, so as to result in a polymer concentrate and mixing the polymer concentrate with asphalt, so as to result in a polymer modified asphalt ("PMA"). Some embodiments of the present disclosure relate to formulations comprising a compatibilizer precursor, a polymer concentrate, PMA, or any combination thereof.

28 Claims, 4 Drawing Sheets

(56) References Cited

U.S. PATENT DOCUMENTS

2020/0190377 A1* 6/2020 Croteau ................. C09J 195/00
2021/0171774 A1* 6/2021 Tibah ...................... C08L 17/00

OTHER PUBLICATIONS

Yadoshima S: "Hot melt adhesive having low humidity absorptivity—comprises blend of ethylene !—vinyl!!-acetate copolymer grafted with maleic anhydride, and hydrogenated terpene resin in wt. ratio 95.5-50.50", Aug. 27, 1990, vol. 1990, No. 40, Aug. 27, 1990 (Aug. 27, 1990), XP002479032.

Asphalt Institute: "REOB/VTAE", Jan. 1, 2016 (Jan. 1, 2016), pp. 1-92, XP93123599, ISBN: 978-1-934154-74-8 Retrieved from the Internet: URL: https://www.asphaltinstitute.org/engineering/re-refined-engine-oil-bottom/ [retrieved on Jan. 25, 2024].

Volcanologyanalogues.com, 'Gum Rosin' Oct. 8, 2016, retrieved from <<http://web.archive.org/web/2016108231024/https://sites.google.com/site/volcanologyanalogues/home/gum-rosin>>.

* cited by examiner

COMPATIBILIZER PRECURSOR, METHODS, SYSTEMS, AND USES THEREOF, AND FORMULATIONS INCLUDING THE SAME

RELATED APPLICATIONS

The present application is a continuation of U.S. application Ser. No. 17/112,489, filed Dec. 4, 2020, which claims priority to U.S. Provisional Application No. 62/944,727, filed Dec. 6, 2019, and to U.S. Provisional Application No. 63/032,960, filed Jun. 1, 2020, each of which is incorporated herein in its respective entirety for all purposes.

FIELD

Some embodiments of the present disclosure relate to a polymer compatibilizer precursor that may be used for the modification of materials including, but not limited to, asphalt.

BACKGROUND

Mixing asphalt with polymers (including but not limited to, thermoplastic polymers) may pose challenges due to chemical incompatibilities. For instance, to produce polymer modified asphalt (PMA) with at least one uniformly dispersed polymer in an asphalt matrix, conventional methods may be inadequate. Improved methods, systems, formulations, and uses for improving the compatibility of polymers with asphalt are needed.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Some embodiments of the present disclosure relate to at least one compatibilizer precursor. In some embodiments, the at least one compatibilizer precursor is used for polymer modification of materials including, but not limited to, asphalt. In some embodiments, the at least one compatibilizer precursor is used to make roofing materials, including, but not limited to roofing shingles and flexible rolled roofing. In some embodiments, the roofing materials are manufactured using processes which are currently used in the roofing manufacturing industry.

Some embodiments of the present disclosure relate to method for making a concentrate by mixing the at least one compatibilizer precursor with asphalt. In some embodiments, the concentrate reduces the incompatibility gap between at least one polymer and asphalt, thereby facilitating preparation of polymer modified asphalt (PMA) using less mixing energy and shorter mixing time as compared to conventional methods (e.g., methods that apply high shearing energy for long shear mixing time, methods that use crosslinking agents, methods that use aging, methods that use curing, or any combination thereof). In some embodiments, at least one oil is added to the asphalt to influence the asphalt composition prior to or during mixing the asphalt and the at least one polymer.

Some embodiments of the present disclosure relate to a method comprising mixing at least one compatibilizer precursor with at least one polymer, so as to result in a polymer concentrate. In some embodiments, the at least one polymer is mixed with the at least one compatibilizer precursor in a weight ratio of the at least one polymer to the at least one compatibilizer precursor of 1:100 to 2:1. In some embodiments the method further comprises mixing the polymer concentrate with asphalt, so as to result in a polymer modified asphalt ("PMA").

In some embodiments, the at least one compatibilizer precursor comprises at least one resin, at least one process oil, or any combination thereof.

In some embodiments, the at least one resin comprises least one terpene resin, at least one petroleum resin, at least one hydrogenated rosin, at least one rosin milk, at least one petroleum resin emulsion, at least one terpene-phenolic resin, at least one hydrogenated petroleum resin, at least one aliphatic hydrocarbon resin, at least one hydrogenated aliphatic hydrocarbon resin, at least one aromatic modified aliphatic hydrocarbon resin, at least one hydrogenated aromatic modified aliphatic hydrocarbon resin, at least one polycyclopentadiene resin, at least one hydrogenated polycyclopentadiene resin, at least one cycloaliphatic hydrocarbon resin, at least one hydrogenated cycloaliphatic resin, cycloaliphatic/aromatic hydrocarbon resin, at least one hydrogenated cycloaliphatic/aromatic hydrocarbon resin, hydrogenated aromatic hydrocarbon resin, at least one maleic acid/anhydride modified tackifier, terpene modified aromatic and/or aliphatic hydrocarbon resin, at least one hydrogenated terpene modified aromatic and/or aliphatic hydrocarbon resin, at least one polyterpene resin, at least one hydrogenated polyterpene resin, at least one aromatic modified polyterpene resin, at least one hydrogenated aromatic modified polyterpene resin, at least one terpene-phenol resin, at least one hydrogenated terpene-phenol resin, at least one gum rosin resin, at least one hydrogenated gum rosin resin, at least one gum rosin ester resin, at least one wood rosin resin, at least one hydrogenated wood rosin resin, at least one rosin acid resin, at least one hydrogenated rosin acid resin, or any combination thereof.

In some embodiments, the at least one process oil comprises at least one paraffinic oil, at least one petroleum extract, at least one vegetable oil, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), or any combination thereof.

In some embodiments, the at least one polymer comprises at least one polyolefin, oxidized polyethylene (OPE), polyethylene-polypropylene elastomer, ground tire rubber (GTR), isotactic polypropylene (IPP), atactic polypropylene (APP), styrene-butadiene-styrene (SBS) copolymer, a styrene-ethylene-butylene-styrene (SEBS) copolymer, polyvinyl butyral (PVB) or any combination thereof.

In some embodiments, the polymer concentrate has a softening point of at least 195° F. as measured according to ASTM D36.

In some embodiments, the polymer concentrate has a softening point of 195° F. to 350° F. as measured according to ASTM D36.

In some embodiments, the polymer concentrate has a penetration point ("PEN") of at least 15 dmm as measured according to ASTM D5.

In some embodiments, polymer concentrate has a penetration point of 15 dmm to 200 dmm as measured according to ASTM D5.

In some embodiments, wherein the polymer concentrate exhibits an elongation of 50% to 10,000% as tested according to ASTM D828.

In some embodiments, the asphalt has a softening point of at least 100° F. as measured according to ASTM D36.

In some embodiments, the asphalt has a softening point of 100° F. to 250° F. as measured according to ASTM D36.

In some embodiments, the asphalt has a penetration point of at least 2 dmm as measured according to ASTM D5.

In some embodiments, the asphalt has a penetration point of 1 dmm to 50 dmm as measured according to ASTM D5.

In some embodiments, the polymer modified asphalt has a softening point of at least 120° F. as measured according to ASTM D36.

In some embodiments, the polymer modified asphalt has a softening point of 120° F. to 300° F. as measured according to ASTM D36.

In some embodiments, the polymer modified asphalt has a penetration point of at least 10 dmm as measured according to ASTM D5.

In some embodiments, the polymer modified asphalt has a penetration point of 10 dmm to 50 dmm as measured according to ASTM D5.

In some embodiments, the method further comprises adding at least one filler, at least one additive, or any combination thereof to the polymer modified asphalt, so as to result in a filled polymer modified asphalt ("PMA") coating.

In some embodiments, the at least one filler, the at least one additive, or combination thereof, comprises transoctenamer rubber (TOR) a propylene-based elastomer, at least one wax, calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, or any combination thereof.

In some embodiments, the filled PMA coating has a softening point of at least 200° F. as measured according to ASTM D36.

In some embodiments, the filled PMA coating has a softening point of 200° F. to 320° F. as measured according to ASTM D36.

In some embodiments, the filled PMA coating has a penetration point ("PEN") of at least 5 dmm as measured according to ASTM D5.

In some embodiments, the filled PMA coating has a penetration point ("PEN") of 5 dmm to 40 dmm as measured according to ASTM D5.

In some embodiments, mixing the at least one compatibilizer precursor with the at least one polymer is performed over a time period of 3 minutes to 90 minutes.

In some embodiments, mixing the polymer concentrate with asphalt is performed over a time period of 45 minutes to 90 minutes.

In some embodiments, the polymer concentrate is mixed with the asphalt in a weight ratio of the polymer concentrate to the asphalt of 1:50 to 1:1.

Some embodiments of the present disclosure relate to a formulation consisting essentially of: at least one polymer and at least one compatibilizer precursor. In some embodiments, the at least one polymer is present in the formulation in a weight ratio of the at least one polymer to the at least one compatibilizer precursor of 1:100 to 2. In some embodiments, the formulation is a polymer concentrate Some embodiments of the present disclosure relate to a formulation consisting essentially of: at least one polymer, at least one compatibilizer precursor, asphalt, optionally, at least one filler, and optionally, at least one additive. In some embodiments, the at least one polymer is present in the formulation in a weight ratio of the at least one polymer to the asphalt of 1:100 to 1:2. In some embodiments, the at least one compatibilizer precursor is present in the formulation in a weight ratio of the at least one compatibilizer precursor to the asphalt of 1:50 to 1:1. In some embodiments, the formulation is a polymer modified asphalt (PMA).

Some embodiments of the present disclosure relate to a formulation comprising: at least one polymer, at least one compatibilizer precursor, and asphalt. In some embodiments, the at least one polymer is present in the formulation in a weight ratio of the at least one polymer to the asphalt of 1:100 to 1:2. In some embodiments, the at least one compatibilizer precursor is present in the formulation in a weight ratio of the at least one compatibilizer precursor to the asphalt of 1:50 to 1:1. the formulation is a polymer modified asphalt (PMA).

BRIEF DESCRIPTION OF DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
FIG. 1 depicts a non-limiting exemplary prototype of a compatibilizer precursor according to the present disclosure.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

All prior patents, publications, and test methods referenced herein are incorporated by reference in their entireties.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

Some embodiments of the present disclosure relate to a compatibilizer precursor. As defined herein, a compatibilizer precursor is any component or combination of components that, when combined with at least one polymer, improves miscibility of the at least one polymer in asphalt, relative to a miscibility of the polymer in asphalt without the at least one compatibilizer precursor present.

In some embodiments, the at least one compatibilizer precursor comprises at least one resin, at least one process oil, or any combination thereof.

In some embodiments, the at least one resin comprises least one terpene resin, at least one petroleum resin, at least one hydrogenated rosin, at least one rosin milk, at least one petroleum resin emulsion, at least one terpene-phenolic resin, at least one hydrogenated petroleum resin, at least one aliphatic hydrocarbon resin, at least one hydrogenated aliphatic hydrocarbon resin, at least one aromatic modified aliphatic hydrocarbon resin, at least one hydrogenated aromatic modified aliphatic hydrocarbon resin, at least one polycyclopentadiene resin, at least one hydrogenated polycyclopentadiene resin, at least one cycloaliphatic hydrocarbon resin, at least one hydrogenated cycloaliphatic resin, cycloaliphatic/aromatic hydrocarbon resin, at least one hydrogenated cycloaliphatic/aromatic hydrocarbon resin, hydrogenated aromatic hydrocarbon resin, at least one maleic acid/anhydride modified tackifier, terpene modified aromatic and/or aliphatic hydrocarbon resin, at least one hydrogenated terpene modified aromatic and/or aliphatic hydrocarbon resin, at least one polyterpene resin, at least one hydrogenated polyterpene resin, at least one aromatic modified polyterpene resin, at least one hydrogenated aromatic modified polyterpene resin, at least one terpene-phenol resin, at least one hydrogenated terpene-phenol resin, at least one gum rosin resin, at least one hydrogenated gum rosin resin, at least one gum rosin ester resin, at least one wood rosin resin, at least one hydrogenated wood rosin resin, at least one rosin acid resin, at least one hydrogenated rosin acid resin, or any combination thereof.

In some embodiments, the at least one process oil comprises at least one paraffinic oil, at least one petroleum extract, at least one vegetable oil, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), or any combination thereof.

In some embodiments, the at least one compatibilizer precursor reduces an incompatibility gap between at least one polymer and asphalt. In some embodiments, the reduction in the incompatibility gap provides improved dispersion of the at least one polymer in an asphalt matrix. In some embodiments, the improved dispersion results in a more stable coating mixed for shorter time as compared to conventional methods.

In some embodiments, the at least one compatibilizer precursor is used for polymer modification of asphalt. In some embodiments, the at least one compatibilizer precursor is used for polymer modification of at least one non-asphaltic coating. In some embodiments, the at least one compatibilizer precursor is used for polymer modification of combinations of asphalt and at least one non-asphaltic coating.

In some embodiments, the at least one compatibilizer precursor is prepared by mixing at least one polymer (including, but not limited to, a thermoplastic polymer) with the at least one compatibilizer precursor, which may comprise at least one oil (including but not limited to a conveyor oil, such as a hydrocarbon oil, a process oil, or any combination thereof), so as to form a polymer concentrate.

As defined herein, a "polymer concentrate" is a mixture of at least one compatibilizer precursor and at least one polymer. In some embodiments, the concentrate is a "polymer rich" concentrate. In some embodiments, the mixing is performed with a "high shear" mixer. In some embodiments, the mixing is performed with a "low shear" mixer. Non-limiting examples of "high shear mixers" are described herein in the examples.

In some embodiments, the at least one polymer comprises at least one polyolefin, oxidized polyethylene (OPE), poly-ethylene-polypropylene elastomer, ground tire rubber (GTR), isotactic polypropylene (IPP), atactic polypropylene (APP), styrene-butadiene-styrene (SBS) copolymer, a styrene-ethylene-butylene-styrene (SEBS) copolymer, polyvinyl butyral (PVB) or any combination thereof.

In some embodiments, the at least one polymer comprises styrenic block copolymer and the at least one oil comprises Hydrolene®. In some embodiments, a concentrate comprising styrenic block copolymer and Hydrolene® comprises up to 50% of styrenic block copolymer by total weight of the concentrate. In some embodiments, a concentrate comprising styrenic block copolymer and Hydrolene® comprises up to 40% of styrenic block copolymer by total weight of the concentrate. In some embodiments, a concentrate comprising styrenic block copolymer and Hydrolene® comprises up to 30% of styrenic block copolymer by total weight of the concentrate. In some embodiments, a concentrate comprising styrenic block copolymer and Hydrolene® comprises up to 20% of styrenic block copolymer by total weight of the concentrate. In some embodiments, a concentrate comprising styrenic block copolymer and Hydrolene® comprises up to 10% of styrenic block copolymer by total weight of the concentrate.

In some embodiments, the at least one polymer may comprise at least one polymer chosen from: a polyolefin, an ethylene based polymer, an amorphous polyalphaolefin, polypropylene/polyvinyl butyral, or any combination thereof.

Specific, commercially available, non-limiting examples of the at least one polymer according to the present disclosure include: Kraton™ SBS, Kraton™ SEBS, Rextac® 2304, or any combination thereof.

In some embodiments, the at least one compatibilizer precursor works by filling an incompatibility gap between the at least one polymer and the asphalt, so as to provide improved dispersion of the at least one polymer in an asphalt matrix. In some embodiments, the filling of the incompatibility gap is achieved by influencing at least one of: shape, size or spatial distribution of a plurality of phases of the at least one polymer, the asphalt, or any combination thereof. In some embodiments, the filling of the incompatibility gap may stem from the at least one compatibilizer precursor influencing an intricate interplay between viscoelasticity of each phase of the plurality of phases of the at least one polymer, the asphalt, or any combination thereof. In some embodiments, the filling of the incompatibility gap may stem from the at least one compatibilizer precursor modifying properties of at least one interface between the at least one polymer and asphalt. In some embodiments, the filling of the incompatibility gap may stem from a blend composition of the at least one polymer, the asphalt, or any combination thereof.

In some embodiments, modifying the asphalt with the at least one compatibilizer precursor may improve miscibility between an asphalt micellular structure and the at least one polymer. In some embodiments, modifying the asphalt with the at least one compatibilizer precursor may improve an interfacial area between an asphalt micellular structure and the at least one polymer. In some embodiments, modifying the asphalt with the at least one compatibilizer precursor may improve adhesion between the at least one polymer and a plurality of asphalt micelles. In some embodiments, modifying the asphalt with the at least one compatibilizer precursor may improve phase morphology.

In some embodiments, the improvements are relative to methods and systems where the asphalt, the at least one oil, and the at least one polymer had been batched together prior to mixing. In some embodiments, when the at least one oil is added to the asphalt, compatibility between the polymer and the asphalt is improved when compared to a system consisting of (i.e., including only) asphalt and at least one polymer described herein.

In some embodiments, compatibilizer molecules are formed. In some embodiments, the compatibilizer molecules are formed at surfaces of small generated particles. In some embodiments, the formation of the compatibilizer molecules diminishes coalescence of polymer modified asphalt (PMA) during subsequent processing.

In some embodiments, any aspect of the disclosure herein may reduce mixing time, reduce dynamic coalescence, reduce static coalescence, or any combination thereof. In some embodiments, any aspect of the disclosure herein may result in a more stable PMA coating, a more stable polymer-modified-non-asphaltic coating or any combination thereof. In some embodiments, any aspect of the disclosure herein may provide for an ability to incorporate higher polymer loadings into PMA to achieve enhanced performance.

In some embodiments, formulations may be prepared by adding the at least one compatibilizer precursor to asphalt, such that a resulting PMA can be tested. In some embodiments, the formulations may be prepared into coatings. In some embodiments, the coatings may comprise at least one filler including, but not limited to: at least one mineral filler, limestone, fiberglass particles, stone dust, or any combination thereof. In some embodiments, the coatings may be tested for use in shingle and roofing fabrication.

In some embodiments, the coatings may comprise at least one additive. In some embodiments, the at least one additive comprises at least one wax including, but not limited to, at least one liquid wax, at least one solid wax, or any combination thereof. In some embodiments, the at least one wax may comprise a polyacrylic acid wax, a polyamide wax, or a combination thereof (herein referred to individually or collectively as "PAA" wax). In some embodiments, the at least one additive comprises transoctenamer rubber (TOR). In some embodiments, the at least one additive comprises at least one propylene-based elastomer, a non-limiting example of which is Vistamaxx™ 6102 from Exxon-Mobil®.

In some embodiments, laboratory coupons may be prepared by applying the coatings to a substrate. In some embodiments the substrate may be a mat. In some embodiments, the mat is a glass mat or fiberglass mat. In some embodiments, a surface protective material such as granules may be applied to the substrate. In some embodiments, the laboratory coupons may be tested for properties applicable to shingles, such as roofing shingles.

Some embodiments of the present disclosure relate to a method of using the at least one compatibilizer precursor to manufacture at least one of the following: a polymer concentrate, a polymer modified asphalt, a filled asphalt coating, at least one roofing product (such as, but not limited to a roofing shingle), or any combination thereof.

In some embodiments, an exemplary method comprises mixing at least one compatibilizer precursor with at least one polymer, so as to result in the polymer concentrate.

In some embodiments, the mixing of the at least one compatibilizer precursor with the at least one polymer is performed over a time period of 3 minutes to 90 minutes. In some embodiments, the mixing of the at least one compatibilizer precursor with the at least one polymer is performed over a time period of 10 minutes to 90 minutes. In some embodiments, the mixing of the at least one compatibilizer precursor with the at least one polymer is performed over a time period of 30 minutes to 90 minutes. In some embodiments, the mixing of the at least one compatibilizer precursor with the at least one polymer is performed over a time period of 45 minutes to 90 minutes. In some embodiments, the mixing of the at least one compatibilizer precursor with the at least one polymer is performed over a time period of 60 minutes to 90 minutes.

In some embodiments, the mixing of the at least one compatibilizer precursor with the at least one polymer is performed over a time period of 3 minutes to 60 minutes. In some embodiments, the mixing of the at least one compatibilizer precursor with the at least one polymer is performed over a time period of 3 minutes to 45 minutes. In some embodiments, the mixing of the at least one compatibilizer precursor with the at least one polymer is performed over a time period of 3 minutes to 30 minutes. In some embodiments, the mixing of the at least one compatibilizer precursor with the at least one polymer is performed over a time period of 3 minutes to 10 minutes.

In some embodiments, the mixing of the at least one compatibilizer precursor with the at least one polymer is performed over a time period of 10 minutes to 60 minutes. In some embodiments, the mixing of the at least one compatibilizer precursor with the at least one polymer is performed over a time period of 30 minutes to 45 minutes.

In some embodiments, mixing the compatibilizer precursor with asphalt is performed over a time period that is less than a comparative time period where the at least one polymer is mixed with asphalt, using at least one mixer of the same type, but where the compatibilizer precursor is not present in the at least one mixer during the comparative time period.

In some embodiments, mixing the compatibilizer precursor with asphalt is performed over a time period that is 1% to 99% less than a comparative time period where the at least one polymer is mixed with asphalt, using at least one mixer of the same type, but where the compatibilizer precursor is not present in the at least one mixer during the comparative time period. In some embodiments, mixing the compatibilizer precursor with asphalt is performed over a time period that is 1% to 95% less than a comparative time period where the at least one polymer is mixed with asphalt, using at least one mixer of the same type, but where the compatibilizer precursor is not present in the at least one mixer during the comparative time period. In some embodiments, mixing the compatibilizer precursor with asphalt is performed over a time period that is 1% to 90% less than a comparative time period where the at least one polymer is mixed with asphalt, using at least one mixer of the same type, but where the compatibilizer precursor is not present in the at least one mixer during the comparative time period. In some embodiments, mixing the compatibilizer precursor with asphalt is performed over a time period that is 1% to 75% less than a comparative time period where the at least one polymer is mixed with asphalt, using at least one mixer of the same type, but where the compatibilizer precursor is not present in the at least one mixer during the comparative time period. In some embodiments, mixing the compatibilizer precursor with asphalt is performed over a time period that is 1% to 50% less than a comparative time period where the at least one polymer is mixed with asphalt, using at least one mixer of the same type, but where the compatibilizer precursor is not present in the at least one mixer during the comparative time period. In some embodiments, mixing the compatibilizer precursor with asphalt is performed over a time period that is 1% to 25% less than a comparative time period where the at least one polymer is mixed with asphalt, using at least one mixer of the same type, but where the compatibilizer precursor is not present in the at least one mixer during the comparative time period.

In some embodiments, mixing the compatibilizer precursor with asphalt is performed over a time period that is 10% to 99% less than a comparative time period where the at least one polymer is mixed with asphalt, using at least one mixer of the same type, but where the compatibilizer precursor is not present in the at least one mixer during the comparative time period. In some embodiments, mixing the compatibilizer precursor with asphalt is performed over a time period that is 25% to 99% less than a comparative time period where the at least one polymer is mixed with asphalt, using at least one mixer of the same type, but where the compatibilizer precursor is not present in the at least one mixer during the comparative time period. In some embodiments, mixing the compatibilizer precursor with asphalt is performed over a time period that is 50% to 99% less than a comparative time period where the at least one polymer is mixed with asphalt, using at least one mixer of the same type, but where the compatibilizer precursor is not present in the at least one mixer during the comparative time period. In some embodiments, mixing the compatibilizer precursor with asphalt is performed over a time period that is 75% to 99% less than a comparative time period where the at least one polymer is mixed with asphalt, using at least one mixer of the same type, but where the compatibilizer precursor is not present in the at least one mixer during the comparative time period. In some embodiments, mixing the compatibilizer precursor with asphalt is performed over a time period that is 90% to 99% less than a comparative time period where the at least one polymer is mixed with asphalt, using at least one mixer of the same type, but where the compatibilizer precursor is not present in the at least one mixer during the comparative time period. In some embodiments, mixing the compatibilizer precursor with asphalt is performed over a time period that is 95% to 99% less than a comparative time period where the at least one polymer is mixed with asphalt, using at least one mixer of the same type, but where the compatibilizer precursor is not present in the at least one mixer during the comparative time period.

In some embodiments, mixing the compatibilizer precursor with asphalt is performed over a time period that is 10% to 95% less than a comparative time period where the at least one polymer is mixed with asphalt, using at least one mixer of the same type, but where the compatibilizer precursor is not present in the at least one mixer during the comparative time period. In some embodiments, mixing the compatibilizer precursor with asphalt is performed over a time period that is 25% to 90% less than a comparative time period where the at least one polymer is mixed with asphalt, using at least one mixer of the same type, but where the compatibilizer precursor is not present in the at least one mixer during the comparative time period. In some embodiments, mixing the compatibilizer precursor with asphalt is performed over a time period that is 50% to 75% less than a comparative time period where the at least one polymer is mixed with asphalt, using at least one mixer of the same type, but where the compatibilizer precursor is not present in the at least one mixer during the comparative time period.

In some embodiments, the at least one polymer is mixed with the at least one compatibilizer precursor, to form the polymer concentrate, in a weight ratio of the at least one polymer to the at least one compatibilizer precursor of 1:100 to 2:1. In some embodiments, the at least one polymer is mixed with the at least one compatibilizer precursor, to form the polymer concentrate, in a weight ratio of the at least one polymer to the at least one compatibilizer precursor of 1:50 to 2:1. In some embodiments, the at least one polymer is mixed with the at least one compatibilizer precursor, to form the polymer concentrate, in a weight ratio of the at least one polymer to the at least one compatibilizer precursor of 1:10 to 2:1. In some embodiments, the at least one polymer is mixed with the at least one compatibilizer precursor, to form the polymer concentrate, in a weight ratio of the at least one polymer to the at least one compatibilizer precursor of 1:5 to 2:1. In some embodiments, the at least one polymer is mixed with the at least one compatibilizer precursor, to form the polymer concentrate, in a weight ratio of the at least one polymer to the at least one compatibilizer precursor of 1:2 to 2:1. In some embodiments, the at least one polymer is mixed with the at least one compatibilizer precursor, to form the polymer concentrate, in a weight ratio of the at least one polymer to the at least one compatibilizer precursor of 1:1 to 2:1.

In some embodiments, the at least one polymer is mixed with the at least one compatibilizer precursor, to form the polymer concentrate, in a weight ratio of the at least one polymer to the at least one compatibilizer precursor of 1:100 to 2:1. In some embodiments, the at least one polymer is mixed with the at least one compatibilizer precursor, to form the polymer concentrate, in a weight ratio of the at least one polymer to the at least one compatibilizer precursor of 1:100 to 1:1. In some embodiments, the at least one polymer is mixed with the at least one compatibilizer precursor, to form the polymer concentrate, in a weight ratio of the at least one polymer to the at least one compatibilizer precursor of 1:100 to 1:2. In some embodiments, the at least one polymer is mixed with the at least one compatibilizer precursor, to form the polymer concentrate, in a weight ratio of the at least one polymer to the at least one compatibilizer precursor of 1:100 to 1:5. In some embodiments, the at least one polymer is mixed with the at least one compatibilizer precursor, to form the polymer concentrate, in a weight ratio of the at least one polymer to the at least one compatibilizer precursor of 1:100 to 1:10. In some embodiments, the at least one polymer is mixed with the at least one compatibilizer precursor, to form the polymer concentrate, in a weight ratio of the at least one polymer to the at least one compatibilizer precursor of 1:100 to 1:20. In some embodiments, the at least one polymer is mixed with the at least one compatibilizer precursor, to form the polymer concentrate, in a weight ratio of the at least one polymer to the at least one compatibilizer precursor of 1:100 to 1:50.

In some embodiments, the at least one polymer is mixed with the at least one compatibilizer precursor, to form the polymer concentrate, in a weight ratio of the at least one polymer to the at least one compatibilizer precursor of 1:50 to 1:1. In some embodiments, the at least one polymer is mixed with the at least one compatibilizer precursor, to form the polymer concentrate, in a weight ratio of the at least one polymer to the at least one compatibilizer precursor of 1:20 to 1:2. In some embodiments, the at least one polymer is mixed with the at least one compatibilizer precursor, to form the polymer concentrate, in a weight ratio of the at least one polymer to the at least one compatibilizer precursor of 1:10 to 1:5.

In some embodiments, the at least one polymer is mixed with the at least one compatibilizer precursor, to form the polymer concentrate, in a weight ratio of the at least one polymer to the at least one compatibilizer precursor of 1:9 to 1:1. In some embodiments, the at least one polymer is mixed with the at least one compatibilizer precursor, to form the polymer concentrate, in a weight ratio of the at least one polymer to the at least one compatibilizer precursor of 1:8 to 1:1. In some embodiments, the at least one polymer is mixed with the at least one compatibilizer precursor, to form the polymer concentrate, in a weight ratio of the at least one polymer to the at least one compatibilizer precursor of 1:7 to 1:1. In some embodiments, the at least one polymer is mixed with the at least one compatibilizer precursor, to form the polymer concentrate, in a weight ratio of the at least one polymer to the at least one compatibilizer precursor of 1:6 to 1:1. In some embodiments, the at least one polymer is mixed with the at least one compatibilizer precursor, to form the polymer concentrate, in a weight ratio of the at least one polymer to the at least one compatibilizer precursor of 1:5 to 1:1. In some embodiments, the at least one polymer is mixed with the at least one compatibilizer precursor, to form the polymer concentrate, in a weight ratio of the at least one polymer to the at least one compatibilizer precursor of 1:4 to 1:1. In some embodiments, the at least one polymer is mixed with the at least one compatibilizer precursor, to form the polymer concentrate, in a weight ratio of the at least one polymer to the at least one compatibilizer precursor of 1:3 to 1:1. In some embodiments, the at least one polymer is mixed with the at least one compatibilizer precursor, to form the polymer concentrate, in a weight ratio of the at least one polymer to the at least one compatibilizer precursor of 1:2 to 1:1.

In some embodiments, the at least one polymer is mixed with the at least one compatibilizer precursor, to form the polymer concentrate, in a weight ratio of the at least one polymer to the at least one compatibilizer precursor of 1:9 to 1:2. In some embodiments, the at least one polymer is mixed with the at least one compatibilizer precursor, to form the polymer concentrate, in a weight ratio of the at least one polymer to the at least one compatibilizer precursor of 1:9 to 1:3. In some embodiments, the at least one polymer is mixed with the at least one compatibilizer precursor, to form the polymer concentrate, in a weight ratio of the at least one polymer to the at least one compatibilizer precursor of 1:9 to 1:4. In some embodiments, the at least one polymer is mixed with the at least one compatibilizer precursor, to form the polymer concentrate, in a weight ratio of the at least one polymer to the at least one compatibilizer precursor of 1:9 to 1:5. In some embodiments, the at least one polymer is mixed with the at least one compatibilizer precursor, to form the polymer concentrate, in a weight ratio of the at least one polymer to the at least one compatibilizer precursor of 1:9 to 1:6. In some embodiments, the at least one polymer is mixed with the at least one compatibilizer precursor, to form the polymer concentrate, in a weight ratio of the at least one polymer to the at least one compatibilizer precursor of 1:9 to 1:7. In some embodiments, the at least one polymer is mixed with the at least one compatibilizer precursor, to form the polymer concentrate, in a weight ratio of the at least one polymer to the at least one compatibilizer precursor of 1:9 to 1:8.

In some embodiments, the at least one polymer is mixed with the at least one compatibilizer precursor, to form the polymer concentrate, in a weight ratio of the at least one polymer to the at least one compatibilizer precursor of 1:8 to 1:2. In some embodiments, the at least one polymer is mixed with the at least one compatibilizer precursor, to form the polymer concentrate, in a weight ratio of the at least one polymer to the at least one compatibilizer precursor of 1:7 to 1:3. In some embodiments, the at least one polymer is mixed with the at least one compatibilizer precursor, to form the polymer concentrate, in a weight ratio of the at least one polymer to the at least one compatibilizer precursor of 1:6 to 1:4.

In some embodiments, the polymer concentrate has a softening point of at least 195° F. as measured according to ASTM D36. In some embodiments, the polymer concentrate has a softening point of at least 200° F. as measured according to ASTM D36. In some embodiments, the polymer concentrate has a softening point of at least 205° F. as measured according to ASTM D36. In some embodiments, the polymer concentrate has a softening point of at least 210° F. as measured according to ASTM D36. In some embodiments, the polymer concentrate has a softening point of at least 215° F. as measured according to ASTM D36. In some embodiments, the polymer concentrate has a softening point of at least 220° F. as measured according to ASTM D36. In some embodiments, the polymer concentrate has a softening point of at least 230° F. as measured according to ASTM D36. In some embodiments, the polymer concentrate has a softening point of at least 240° F. as measured according to ASTM D36. In some embodiments, the polymer concentrate has a softening point of at least 250° F. as measured according to ASTM D36. In some embodiments, the polymer concentrate has a softening point of at least 260° F. as measured according to ASTM D36. In some embodiments, the polymer concentrate has a softening point of at least 270° F. as measured according to ASTM D36. In some embodiments, the polymer concentrate has a softening point of at least 280° F. as measured according to ASTM D36. In some embodiments, the polymer concentrate has a softening point of at least 290° F. as measured according to ASTM D36. In some embodiments, the polymer concentrate has a softening point of at least 300° F. as measured according to ASTM D36. In some embodiments, the polymer concentrate has a softening point of at least 310° F. as measured according to ASTM D36. In some embodiments, the polymer concentrate has a softening point of at least 320° F. as measured according to ASTM D36. In some embodiments, the polymer concentrate has a softening point of at least 330° F. as measured according to ASTM D36. In some embodiments, the polymer concentrate has a softening point of at least 340° F. as measured according to ASTM D36. In some embodiments, the polymer concentrate has a softening point of at least 350° F. as measured according to ASTM D36.

In some embodiments, the polymer concentrate has a softening point of 195° F. to 350° F. as measured according to ASTM D36. In some embodiments, the polymer concentrate has a softening point of 200° F. to 350° F. as measured according to ASTM D36. In some embodiments, the polymer concentrate has a softening point of 225° F. to 350° F. as measured according to ASTM D36. In some embodiments, the polymer concentrate has a softening point of 250° F. to 350° F. as measured according to ASTM D36. In some embodiments, the polymer concentrate has a softening point of 275° F. to 350° F. as measured according to ASTM D36. In some embodiments, the polymer concentrate has a softening point of 300° F. to 350° F. as measured according to ASTM D36. In some embodiments, the polymer concentrate has a softening point of 325° F. to 350° F. as measured according to ASTM D36.

In some embodiments, the polymer concentrate has a softening point of 195° F. to 325° F. as measured according to ASTM D36. In some embodiments, the polymer concentrate has a softening point of 195° F. to 300° F. as measured according to ASTM D36. In some embodiments, the polymer concentrate has a softening point of 195° F. to 275° F. as measured according to ASTM D36. In some embodiments, the polymer concentrate has a softening point of 195° F. to 250° F. as measured according to ASTM D36. In some embodiments, the polymer concentrate has a softening point of 195° F. to 225° F. as measured according to ASTM D36. In some embodiments, the polymer concentrate has a softening point of 195° F. to 200° F. as measured according to ASTM D36.

In some embodiments, the polymer concentrate has a softening point of 200° F. to 300° F. as measured according to ASTM D5. In some embodiments, the polymer concentrate has a softening point of 225° F. to 275° F. as measured according to ASTM D5.

In some embodiments, the polymer concentrate has a penetration point ("PEN") of at least 15 dmm as measured according to ASTM D5. In some embodiments, the polymer concentrate has a penetration point ("PEN") of at least 25 dmm as measured according to ASTM D5. In some embodiments, the polymer concentrate has a penetration point ("PEN") of at least 50 dmm as measured according to ASTM D5. In some embodiments, the polymer concentrate has a penetration point ("PEN") of at least 75 dmm as measured according to ASTM D5. In some embodiments, the polymer concentrate has a penetration point ("PEN") of at least 100 dmm as measured according to ASTM D5. In some embodiments, the polymer concentrate has a penetration point ("PEN") of at least 125 dmm as measured according to ASTM D5. In some embodiments, the polymer concentrate has a penetration point ("PEN") of at least 150 dmm as measured according to ASTM D5. In some embodiments, the polymer concentrate has a penetration point ("PEN") of at least 175 dmm as measured according to ASTM D5. In some embodiments, the polymer concentrate has a penetration point ("PEN") of at least 200 dmm as measured according to ASTM D5.

In some embodiments, the polymer concentrate has a PEN of 15 dmm to 200 dmm as measured according to ASTM D5. In some embodiments, the polymer concentrate has a PEN of 25 dmm to 200 dmm as measured according to ASTM D5. In some embodiments, the polymer concentrate has a PEN of 50 dmm to 200 dmm as measured according to ASTM D5. In some embodiments, the polymer concentrate has a PEN of 75 dmm to 200 dmm as measured according to ASTM D5. In some embodiments, the polymer concentrate has a PEN of 100 dmm to 200 dmm as measured according to ASTM D5. In some embodiments, the polymer concentrate has a PEN of 150 dmm to 200 dmm as measured according to ASTM D5. In some embodiments, the polymer concentrate has a PEN of 175 dmm to 200 dmm as measured according to ASTM D5.

In some embodiments, the polymer concentrate has a PEN of 15 dmm to 175 dmm as measured according to ASTM D5. In some embodiments, the polymer concentrate has a PEN of 15 dmm to 150 dmm as measured according to ASTM D5. In some embodiments, the polymer concentrate has a PEN of 15 dmm to 125 dmm as measured according to ASTM D5. In some embodiments, the polymer concentrate has a PEN of 15 dmm to 100 dmm as measured according to ASTM D5. In some embodiments, the polymer concentrate has a PEN of 15 dmm to 75 dmm as measured according to ASTM D5. In some embodiments, the polymer concentrate has a PEN of 15 dmm to 50 dmm as measured according to ASTM D5. In some embodiments, the polymer concentrate has a PEN of 15 dmm to 25 dmm as measured according to ASTM D5.

In some embodiments, the polymer concentrate has a PEN of 25 dmm to 175 dmm as measured according to ASTM D5. In some embodiments, the polymer concentrate has a PEN of 50 dmm to 150 dmm as measured according to ASTM D5. In some embodiments, the polymer concentrate has a PEN of 75 dmm to 125 dmm as measured according to ASTM D5.

In some embodiments, the method further comprises mixing the polymer concentrate with asphalt, so as to result in a polymer modified asphalt ("PMA").

In some embodiments, mixing the polymer concentrate with asphalt is performed over a time period of 45 minutes to 90 minutes. In some embodiments, mixing the polymer concentrate with asphalt is performed over a time period of 60 minutes to 90 minutes. In some embodiments, mixing the polymer concentrate with asphalt is performed over a time period of 75 minutes to 90 minutes.

In some embodiments, mixing the polymer concentrate with asphalt is performed over a time period of 45 minutes to 75 minutes. In some embodiments, mixing the polymer concentrate with asphalt is performed over a time period of 45 minutes to 60 minutes.

In some embodiments, mixing the polymer concentrate with asphalt is performed over a time period of 60 minutes to 75 minutes.

In some embodiments, mixing the polymer concentrate with asphalt (so as to form the PMA) is performed over a time period that is less than a comparative time period where the at least one polymer is mixed with the same type of asphalt, using at least one mixer of the same type, but where the at least one polymer is not present in the polymer concentrate during the comparative time period (i.e., where the at least one polymer is not present in a mixture comprising the at least one polymer and the compatibilizer precursor during the comparative time period).

In some embodiments, mixing the polymer concentrate with asphalt is performed over a time period that is 1% to 99% less than a comparative time period where the at least one polymer is mixed with the same type of asphalt, using at least one mixer of the same type, but where the at least one polymer is not present in the polymer concentrate during the comparative time period. In some embodiments, mixing the polymer concentrate with asphalt is performed over a time period that is 10% to 99% less than a comparative time period where the at least one polymer is mixed with the same type of asphalt, using at least one mixer of the same type, but where the at least one polymer is not present in the polymer concentrate during the comparative time period. In some embodiments, mixing the polymer concentrate with asphalt is performed over a time period that is 25% to 99% less than a comparative time period where the at least one polymer is mixed with the same type of asphalt, using at least one mixer of the same type, but where the at least one polymer is not present in the polymer concentrate during the comparative time period. In some embodiments, mixing the polymer concentrate with asphalt is performed over a time period that is 50% to 99% less than a comparative time period where the at least one polymer is mixed with the same type of asphalt, using at least one mixer of the same type, but where the at least one polymer is not present in the polymer concentrate during the comparative time period. In some embodiments, mixing the polymer concentrate with asphalt is performed over a time period that is 75% to 99% less than a comparative time period where the at least one polymer is mixed with the same type of asphalt, using at least one mixer of the same type, but where the at least one polymer is not present in the polymer concentrate during the comparative time period. In some embodiments, mixing the polymer concentrate with asphalt is performed over a time period that is 90% to 99% less than a comparative time period where the at least one polymer is mixed with the same type of asphalt, using at least one mixer of the same type, but where the at least one polymer is not present in the polymer concentrate during the comparative time period. In some embodiments, mixing the polymer concentrate with asphalt is performed over a time period that is 95% to 99% less than a comparative time period where the at least one polymer is mixed with the same type of asphalt, using at least one mixer of the same type, but where the at least one polymer is not present in the polymer concentrate during the comparative time period.

In some embodiments, mixing the polymer concentrate with asphalt is performed over a time period that is 1% to 95% less than a comparative time period where the at least one polymer is mixed with the same type of asphalt, using at least one mixer of the same type, but where the at least one polymer is not present in the polymer concentrate during the comparative time period. In some embodiments, mixing the polymer concentrate with asphalt is performed over a time period that is 1% to 90% less than a comparative time period where the at least one polymer is mixed with the same type of asphalt, using at least one mixer of the same type, but where the at least one polymer is not present in the polymer concentrate during the comparative time period. In some embodiments, mixing the polymer concentrate with asphalt is performed over a time period that is 1% to 75% less than a comparative time period where the at least one polymer is mixed with the same type of asphalt, using at least one mixer of the same type, but where the at least one polymer is not present in the polymer concentrate during the comparative time period. In some embodiments, mixing the polymer concentrate with asphalt is performed over a time period that is 1% to 50% less than a comparative time period where the at least one polymer is mixed with the same type of asphalt, using at least one mixer of the same type, but where the at least one polymer is not present in the polymer concentrate during the comparative time period. In some embodiments, mixing the polymer concentrate with asphalt is performed over a time period that is 1% to 25% less than a comparative time period where the at least one polymer is mixed with the same type of asphalt, using at least one mixer of the same type, but where the at least one polymer is not present in the polymer concentrate during the comparative time period. In some embodiments, mixing the polymer concentrate with asphalt is performed over a time period that is 1% to 10% less than a comparative time period where the at least one polymer is mixed with the same type of asphalt, using at least one mixer of the same type, but where the at least one polymer is not present in the polymer concentrate during the comparative time period In some embodiments, mixing the polymer concentrate with asphalt is performed over a time period that is 10% to 95% less than a comparative time period where the at least one polymer is mixed with the same type of asphalt, using at least one mixer of the same type, but where the at least one polymer is not present in the polymer concentrate during the comparative time period. In some embodiments, mixing the polymer concentrate with asphalt is performed over a time period that is 25% to 90% less than a comparative time period where the at least one polymer is mixed with the same type of asphalt, using at least one mixer of the same type, but where the at least one polymer is not present in the polymer concentrate during the comparative time period. In some embodiments, mixing the polymer concentrate with asphalt is performed over a time period that is 50% to 75% less than a comparative time period where the at least one polymer is mixed with the same type of asphalt, using at least one mixer of the same type, but where the at least one polymer is not present in the polymer concentrate during the comparative time period.

In some embodiments, an exemplary comparative time period where the at least one polymer is mixed with asphalt, without the compatibilizer precursor being present, is 150 minutes or higher. In some embodiments, an exemplary comparative time period where the at least one polymer is mixed with asphalt, without the compatibilizer precursor being present, is 200 minutes or higher. In some embodiments, an exemplary comparative time period where the at least one polymer is mixed with asphalt, without the compatibilizer precursor being present, is 250 minutes or higher. In some embodiments, an exemplary comparative time period where the at least one polymer is mixed with asphalt, without the compatibilizer precursor being present, is 300 minutes or higher.

In some embodiments, an exemplary comparative time period where the at least one polymer is mixed with asphalt, without the compatibilizer precursor being present, is 150 minutes to 300 minutes. In some embodiments, an exemplary comparative time period where the at least one polymer is mixed with asphalt, without the compatibilizer precursor being present, is 200 minutes to 300 minutes. In some embodiments, an exemplary comparative time period where the at least one polymer is mixed with asphalt, without the compatibilizer precursor being present, is 250 minutes to 300 minutes.

In some embodiments, an exemplary comparative time period where the at least one polymer is mixed with asphalt, without the compatibilizer precursor being present, is 150 minutes to 250 minutes. In some embodiments, an exemplary comparative time period where the at least one polymer is mixed with asphalt, without the compatibilizer precursor being present, is 200 minutes to 250 minutes.

In some embodiments, an exemplary comparative time period where the at least one polymer is mixed with asphalt, without the compatibilizer precursor being present, is 150 minutes to 200 minutes.

In some embodiments, the polymer concentrate is mixed with the asphalt in a weight ratio of the polymer concentrate to the asphalt of 1:50 to 1:1. In some embodiments, the polymer concentrate is mixed with the asphalt in a weight ratio of the polymer concentrate to the asphalt of 1:20 to 1:1. In some embodiments, the polymer concentrate is mixed with the asphalt in a weight ratio of the polymer concentrate to the asphalt of 1:10 to 1:1. In some embodiments, the polymer concentrate is mixed with the asphalt in a weight ratio of the polymer concentrate to the asphalt of 1:5 to 1:1. In some embodiments, the polymer concentrate is mixed with the asphalt in a weight ratio of the polymer concentrate to the asphalt of 1:2 to 1:1.

In some embodiments, the polymer concentrate is mixed with the asphalt in a weight ratio of the polymer concentrate to the asphalt of 1:50 to 1:5. In some embodiments, the polymer concentrate is mixed with the asphalt in a weight ratio of the polymer concentrate to the asphalt of 1:50 to 1:10. In some embodiments, the polymer concentrate is mixed with the asphalt in a weight ratio of the polymer concentrate to the asphalt of 1:50 to 1:20.

In some embodiments, the polymer concentrate is mixed with the asphalt in a weight ratio of the polymer concentrate to the asphalt of 1:20 to 1:5.

In some embodiments, the polymer concentrate is mixed with the asphalt in a weight ratio of the polymer concentrate to the asphalt of 1:3 to 3:1. In some embodiments, the polymer concentrate is mixed with the asphalt in a weight ratio of the polymer concentrate to the asphalt of 1:2 to 3:1. In some embodiments, the polymer concentrate is mixed with the asphalt in a weight ratio of the polymer concentrate to the asphalt of 1:1 to 3:1. In some embodiments, the polymer concentrate is mixed with the asphalt in a weight ratio of the polymer concentrate to the asphalt of 2:1 to 3:1.

In some embodiments, the polymer concentrate is mixed with the asphalt in a weight ratio of the polymer concentrate to the asphalt of 1:3 to 2:1. In some embodiments, the polymer concentrate is mixed with the asphalt in a weight ratio of the polymer concentrate to the asphalt of 1:3 to 1:1. In some embodiments, the polymer concentrate is mixed with the asphalt in a weight ratio of the polymer concentrate to the asphalt of 1:3 to 1:2.

In some embodiments, the polymer concentrate is mixed with the asphalt in a weight ratio of the polymer concentrate to the asphalt of 1:2 to 2:1.

In some embodiments, the asphalt (i.e., the asphalt that is mixed with the polymer concentrate) has a softening point of at least 100° F. as measured according to ASTM D36. In some embodiments, the asphalt has a softening point of at least 125° F. as measured according to ASTM D36. In some embodiments, the asphalt has a softening point of at least 150° F. as measured according to ASTM D36. In some embodiments, the asphalt has a softening point of at least 175° F. as measured according to ASTM D36. In some embodiments, the asphalt has a softening point of at least 200° F. as measured according to ASTM D36. In some embodiments, the asphalt has a softening point of at least 225° F. as measured according to ASTM D36. In some embodiments, the asphalt has a softening point of at least 250° F. as measured according to ASTM D36.

In some embodiments, the asphalt has a softening point of 100° F. to 250° F. as measured according to ASTM D36. In some embodiments, the asphalt has a softening point of 125° F. to 250° F. as measured according to ASTM D36. In some embodiments, the asphalt has a softening point of 150° F. to 250° F. as measured according to ASTM D36. In some embodiments, the asphalt has a softening point of 175° F. to 250° F. as measured according to ASTM D36. In some embodiments, the asphalt has a softening point of 200° F. to 250° F. as measured according to ASTM D36. In some embodiments, the asphalt has a softening point of 225° F. to 250° F. as measured according to ASTM D36.

In some embodiments, the asphalt has a softening point of 100° F. to 225° F. as measured according to ASTM D36. In some embodiments, the asphalt has a softening point of 100° F. to 215° F. as measured according to ASTM D36. In some embodiments, the asphalt has a softening point of 100° F. to 200° F. as measured according to ASTM D36. In some embodiments, the asphalt has a softening point of 100° F. to 175° F. as measured according to ASTM D36. In some embodiments, the asphalt has a softening point of 100° F. to 150° F. as measured according to ASTM D36. In some embodiments, the asphalt has a softening point of 100° F. to 125° F. as measured according to ASTM D36.

In some embodiments, the asphalt has a softening point of 125° F. to 225° F. as measured according to ASTM D36. In some embodiments, the asphalt has a softening point of 150° F. to 200° F. as measured according to ASTM D36. In some embodiments, the asphalt has a softening point of 150° F. to 200° F. as measured according to ASTM D36.

In some embodiments, the asphalt has a penetration point ("PEN") of 1 dmm to 50 dmm as measured according to ASTM D5. In some embodiments, the asphalt has a PEN of 10 dmm to 50 dmm as measured according to ASTM D5. In some embodiments, the asphalt has a PEN of 20 dmm to 50 dmm as measured according to ASTM D5. In some embodiments, the asphalt has a PEN of 30 dmm to 50 dmm as measured according to ASTM D5. In some embodiments, the asphalt has a PEN of 40 dmm to 50 dmm as measured according to ASTM D5.

In some embodiments, the asphalt has a PEN of 1 dmm to 40 dmm as measured according to ASTM D5. In some embodiments, the asphalt has a PEN of 1 dmm to 30 dmm as measured according to ASTM D5. In some embodiments, the asphalt has a PEN of 1 dmm to 20 dmm as measured according to ASTM D5. In some embodiments, the asphalt has a PEN of 1 dmm to 10 dmm as measured according to ASTM D5.

In some embodiments, the asphalt has a PEN of 10 dmm to 40 dmm as measured according to ASTM D5. In some embodiments, the asphalt has a PEN of 20 dmm to 30 dmm as measured according to ASTM D5.

In some embodiments, the asphalt has a PEN of 2 dmm to 80 dmm as measured according to ASTM D5. In some embodiments, the asphalt has a PEN of 10 dmm to 80 dmm as measured according to ASTM D5. In some embodiments, the asphalt has a PEN of 20 dmm to 80 dmm as measured according to ASTM D5. In some embodiments, the asphalt has a PEN of 40 dmm to 80 dmm as measured according to ASTM D5. In some embodiments, the asphalt has a PEN of 60 dmm to 80 dmm as measured according to ASTM D5.

In some embodiments, the asphalt has a PEN of 2 dmm to 60 dmm as measured according to ASTM D5. In some embodiments, the asphalt has a PEN of 2 dmm to 40 dmm as measured according to ASTM D5. In some embodiments, the asphalt has a PEN of 2 dmm to 20 dmm as measured according to ASTM D5. In some embodiments, the asphalt has a PEN of 2 dmm to 10 dmm as measured according to ASTM D5.

In some embodiments, the asphalt has a PEN of 10 dmm to 60 dmm as measured according to ASTM D5. In some embodiments, the asphalt has a PEN of 20 dmm to 40 dmm as measured according to ASTM D5.

In some embodiments, the polymer modified asphalt ("PMA") that results from the mixing of the asphalt and the polymer concentrate has a softening point of at least 120° F. as measured according to ASTM D36. In some embodiments, the PMA has a softening point of at least 125° F. as measured according to ASTM D36. In some embodiments, the PMA has a softening point of at least 150° F. as measured according to ASTM D36. In some embodiments, the PMA has a softening point of at least 175° F. as measured according to ASTM D36. In some embodiments, the PMA that results from the mixing of the asphalt and the polymer concentrate has a softening point of at least 200° F. as measured according to ASTM D36. In some embodiments, the PMA that results from the mixing of the asphalt and the polymer concentrate has a softening point of at least 225° F. as measured according to ASTM D36. In some embodiments, the PMA that results from the mixing of the asphalt and the polymer concentrate has a softening point of at least 250° F. as measured according to ASTM D36. In some embodiments, the PMA that results from the mixing of the asphalt and the polymer concentrate has a softening point of at least 275° F. as measured according to ASTM D36. In some embodiments, PMA that results from the mixing of the asphalt and the polymer concentrate has a softening point of at least 300° F. as measured according to ASTM D36.

In some embodiments, the PMA has a softening point of 120° F. to 300° F. as measured according to ASTM D36. In some embodiments, the PMA has a softening point of 150° F. to 300° F. as measured according to ASTM D36. In some embodiments, the PMA has a softening point of 150° F. to 300° F. as measured according to ASTM D36. In some embodiments, the PMA has a softening point of 175° F. to 300° F. as measured according to ASTM D36. In some embodiments, the PMA has a softening point of 200° F. to 300° F. as measured according to ASTM D36. In some embodiments, the PMA has a softening point of 225° F. to 300° F. as measured according to ASTM D36. In some embodiments, the PMA has a softening point of 250° F. to 300° F. as measured according to ASTM D36. In some embodiments, the PMA has a softening point of 275° F. to 300° F. as measured according to ASTM D36.

In some embodiments, the PMA has a softening point of 120° F. to 275° F. as measured according to ASTM D36. In some embodiments, the PMA has a softening point of 120° F. to 250° F. as measured according to ASTM D36. In some embodiments, the PMA has a softening point of 120° F. to 225° F. as measured according to ASTM D36. In some embodiments, the PMA has a softening point of 120° F. to 200° F. as measured according to ASTM D36. In some embodiments, the PMA has a softening point of 120° F. to 175° F. as measured according to ASTM D36. In some embodiments, the PMA has a softening point of 120° F. to 150° F. as measured according to ASTM D36. In some embodiments, the PMA has a softening point of 120° F. to 125° F. as measured according to ASTM D36.

In some embodiments, the PMA has a softening point of 125° F. to 275° F. as measured according to ASTM D36. In some embodiments, the PMA has a softening point of 125° F. to 250° F. as measured according to ASTM D36. In some embodiments, the PMA has a softening point of 125° F. to 200° F. as measured according to ASTM D36. In some embodiments, the PMA has a softening point of 125° F. to 175° F. as measured according to ASTM D36. In some embodiments, the PMA has a softening point of 125° F. to 150° F. as measured according to ASTM D36.

In some embodiments, the PMA has a softening point of 125° F. to 275° F. as measured according to ASTM D36. In some embodiments, the PMA has a softening point of 150° F. to 250° F. as measured according to ASTM D36. In some embodiments, the PMA has a softening point of 175° F. to 225° F. as measured according to ASTM D36.

In some embodiments, the PMA has a penetration point ("PEN") of at least 10 dmm as measured according to ASTM D5. In some embodiments, the PMA has a PEN of at least 20 dmm as measured according to ASTM D5. In some embodiments, the PMA has a PEN of at least 30 dmm as measured according to ASTM D5. In some embodiments, the PMA has a PEN of at least 40 dmm as measured according to ASTM D5. In some embodiments, the PMA has a PEN of at least 50 dmm as measured according to ASTM D5.

In some embodiments, the PMA has a PEN of 10 dmm to 50 dmm as measured according to ASTM D5. In some embodiments, the PMA has a PEN of 20 dmm to 50 dmm as measured according to ASTM D5. In some embodiments, the PMA has a PEN of 30 dmm to 50 dmm as measured according to ASTM D5. In some embodiments, the PMA has a PEN of 40 dmm to 50 dmm as measured according to ASTM D5.

In some embodiments, the PMA has a PEN of 10 dmm to 40 dmm as measured according to ASTM D5. In some embodiments, the PMA has a PEN of 20 dmm to 30 dmm as measured according to ASTM D5.

In some embodiments, the method further comprises adding at least one filler, at least one additive, or any combination thereof to the polymer modifided asphalt ("PMA"), so as to result in a filled PMA coating.

In some embodiments, the at least one filler, the at least one additive, or combination thereof, comprises transoctenamer rubber (TOR) a propylene-based elastomer, at least one wax, calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, or any combination thereof.

In some embodiments, the filled PMA coating has a softening point of at least 200° F. as measured according to ASTM D36. In some embodiments, the filled PMA coating has a softening point of at least 225° F. as measured according to ASTM D36. In some embodiments, the filled PMA coating has a softening point of at least 250° F. as measured according to ASTM D36. In some embodiments, the filled PMA coating has a softening point of at least 275° F. as measured according to ASTM D36. In some embodiments, the filled PMA coating has a softening point of at least 300° F. as measured according to ASTM D36. In some embodiments, the filled PMA coating has a softening point of at least 325° F. as measured according to ASTM D36.

In some embodiments, the filled PMA coating has a softening point of 200° F. to 320° F. as measured according to ASTM D36. In some embodiments, the filled PMA coating has a softening point of 220° F. to 300° F. as measured according to ASTM D36. In some embodiments, the filled PMA coating has a softening point of 240° F. to 300° F. as measured according to ASTM D36. In some embodiments, the filled PMA coating has a softening point of 260° F. to 300° F. as measured according to ASTM D36. In some embodiments, the filled PMA coating has a softening point of 280° F. to 300° F. as measured according to ASTM D36.

In some embodiments, the filled PMA coating has a softening point of 200° F. to 300° F. as measured according to ASTM D36. In some embodiments, the filled PMA coating has a softening point of 200° F. to 275° F. as measured according to ASTM D36. In some embodiments, the filled PMA coating has a softening point of 200° F. to 250° F. as measured according to ASTM D36. In some embodiments, the filled PMA coating has a softening point of 200° F. to 225° F. as measured according to ASTM D36.

In some embodiments, the filled PMA coating has a softening point of 225° F. to 300° F. as measured according to ASTM D36. In some embodiments, the filled PMA coating has a softening point of 250° F. to 275° F. as measured according to ASTM D36.

In some embodiments, the filled PMA coating has a PEN of at least 5 dmm as measured according to ASTM D5. In some embodiments, the filled PMA coating has a PEN of at least 10 dmm as measured according to ASTM D5. In some embodiments, the filled PMA coating has a PEN of at least 15 dmm as measured according to ASTM D5. In some embodiments, the filled PMA coating has a PEN of at least 20 dmm as measured according to ASTM D5. In some embodiments, the filled PMA coating has a PEN of at least 25 dmm as measured according to ASTM D5. In some embodiments, the filled PMA coating has a PEN of at least 30 dmm as measured according to ASTM D5. In some embodiments, the filled PMA coating has a PEN of at least 35 dmm as measured according to ASTM D5. In some embodiments, the filled PMA coating has a PEN of at least 40 dmm as measured according to ASTM D5.

In some embodiments, the filled PMA coating has a PEN of 5 dmm to 40 dmm as measured according to ASTM D5. In some embodiments, the filled PMA coating has a PEN of 10 dmm to 40 dmm as measured according to ASTM D5. In some embodiments, the filled PMA coating has a PEN of 20 dmm to 40 dmm as measured according to ASTM D5. In some embodiments, the filled PMA coating has a PEN of 30 dmm to 40 dmm as measured according to ASTM D5.

In some embodiments, the filled PMA coating has a PEN of 5 dmm to 30 dmm as measured according to ASTM D5. In some embodiments, the filled PMA coating has a PEN of 5 dmm to 20 dmm as measured according to ASTM D5. In some embodiments, the filled PMA coating has a PEN of 5 dmm to 10 dmm as measured according to ASTM D5.

In some embodiments, the filled PMA coating has a PEN of 10 dmm to 30 dmm as measured according to ASTM D5.

Some embodiments of the present disclosure relate to the polymer concentrate. In some embodiments, the polymer concentrate is a formulation comprising the at least one polymer and the at least one compatibilizer precursor. In some embodiments, the polymer concentrate is a formulation consisting of the at least one polymer and the at least one compatibilizer precursor. In some embodiments, the polymer concentrate is a formulation consisting essentially of the at least one polymer and the at least one compatibilizer precursor.

In some embodiments, the at least one polymer is present in the polymer concentrate in a weight ratio of the at least one polymer to the at least one compatibilizer precursor of 1:100 to 2:1. In some embodiments, the at least one polymer is present in the polymer concentrate in a weight ratio of the at least one polymer to the at least one compatibilizer precursor of 1:50 to 2:1. In some embodiments, the at least one polymer is present in the polymer concentrate in a weight ratio of the at least one polymer to the at least one compatibilizer precursor of 1:20 to 2:1. In some embodiments, the at least one polymer is present in the polymer concentrate in a weight ratio of the at least one polymer to the at least one compatibilizer precursor of 1:10 to 2:1. In some embodiments, the at least one polymer is present in the polymer concentrate in a weight ratio of the at least one polymer to the at least one compatibilizer precursor of 1:5 to 2:1. In some embodiments, the at least one polymer is present in the polymer concentrate in a weight ratio of the at least one polymer to the at least one compatibilizer precursor of 1:2 to 2:1. In some embodiments, the at least one polymer is present in the polymer concentrate in a weight ratio of the at least one polymer to the at least one compatibilizer precursor of 1:1 to 2:1.

In some embodiments, the at least one polymer is present in the polymer concentrate in a weight ratio of the at least one polymer to the at least one compatibilizer precursor of 1:100 to 1:1. In some embodiments, the at least one polymer is present in the polymer concentrate in a weight ratio of the at least one polymer to the at least one compatibilizer precursor of 1:100 to 1:2. In some embodiments, the at least one polymer is present in the polymer concentrate in a weight ratio of the at least one polymer to the at least one compatibilizer precursor of 1:100 to 1:5. In some embodiments, the at least one polymer is present in the polymer concentrate in a weight ratio of the at least one polymer to the at least one compatibilizer precursor of 1:100 to 1:10. In some embodiments, the at least one polymer is present in the polymer concentrate in a weight ratio of the at least one polymer to the at least one compatibilizer precursor of 1:100 to 1:20. In some embodiments, the at least one polymer is present in the polymer concentrate in a weight ratio of the at least one polymer to the at least one compatibilizer precursor of 1:100 to 1:50.

In some embodiments, the at least one polymer is present in the polymer concentrate in a weight ratio of the at least one polymer to the at least one compatibilizer precursor of 1:50 to 1:1. In some embodiments, the at least one polymer is present in the polymer concentrate in a weight ratio of the at least one polymer to the at least one compatibilizer precursor of 1:20 to 1:2. In some embodiments, the at least one polymer is present in the polymer concentrate in a weight ratio of the at least one polymer to the at least one compatibilizer precursor of 1:10 to 1:5.

In some embodiments, the polymer concentrate exhibits an elongation of 50% to 10,000% as tested according to ASTM D828. In some embodiments, the polymer concentrate exhibits an elongation of 100% to 10,000% as tested according to ASTM D828. In some embodiments, the polymer concentrate exhibits an elongation of 500% to 10,000% as tested according to ASTM D828. In some embodiments, the polymer concentrate exhibits an elongation of 1000% to 10,000% as tested according to ASTM D828. In some embodiments, the polymer concentrate exhibits an elongation of 5000% to 10,000% as tested according to ASTM D828.

In some embodiments, the polymer concentrate exhibits an elongation of 50% to 5000% as tested according to ASTM D828. In some embodiments, the polymer concentrate exhibits an elongation of 50% to 1000% as tested according to ASTM D828. In some embodiments, the polymer concentrate exhibits an elongation of 50% to 500% as tested according to ASTM D828. In some embodiments, the polymer concentrate exhibits an elongation of 50% to 100% as tested according to ASTM D828.

In some embodiments, the polymer concentrate exhibits an elongation of 100% to 5000% as tested according to ASTM D828. In some embodiments, the polymer concentrate exhibits an elongation of 500% to 1000% as tested according to ASTM D828.

Some embodiments of the present disclosure relate to the polymer modified asphalt (PMA) described herein. In some embodiments, the PMA is a formulation that comprises at least one polymer, at least one compatibilizer precursor, and asphalt. In some embodiments, the PMA is a formulation that consists of least one polymer, at least one compatibilizer precursor, and asphalt. In some embodiments, the PMA is a formulation that consists essentially of least one polymer, at least one compatibilizer precursor, and asphalt. In some embodiments, the PMA also includes at least one filler described herein, at least one additive described herein, or any combination thereof.

In some embodiments, the at least one polymer is present in the PMA formulation in a weight ratio of the at least one polymer to the asphalt of 1:100 to 1:2. In some embodiments, the at least one polymer is present in the PMA formulation in a weight ratio of the at least one polymer to the asphalt of 1:50 to 1:2. In some embodiments, the at least one polymer is present in the PMA formulation in a weight ratio of the at least one polymer to the asphalt of 1:20 to 1:2. In some embodiments, the at least one polymer is present in the PMA formulation in a weight ratio of the at least one polymer to the asphalt of 1:10 to 1:2. In some embodiments, the at least one polymer is present in the PMA formulation in a weight ratio of the at least one polymer to the asphalt of 1:5 to 1:2.

In some embodiments, the at least one polymer is present in the PMA formulation in a weight ratio of the at least one polymer to the asphalt of 1:100 to 1:5. In some embodiments, the at least one polymer is present in the PMA formulation in a weight ratio of the at least one polymer to the asphalt of 1:100 to 1:10. In some embodiments, the at least one polymer is present in the PMA formulation in a weight ratio of the at least one polymer to the asphalt of 1:100 to 1:20. In some embodiments, the at least one polymer is present in the PMA formulation in a weight ratio of the at least one polymer to the asphalt of 1:100 to 1:50.

In some embodiments, the at least one polymer is present in the PMA formulation in a weight ratio of the at least one polymer to the asphalt of 1:50 to 1:2. In some embodiments, the at least one polymer is present in the PMA formulation in a weight ratio of the at least one polymer to the asphalt of 1:20 to 1:5.

In some embodiments, the at least one compatibilizer precursor is present in the PMA formulation in a weight ratio of the at least one compatibilizer precursor to the asphalt of 1:50 to 1:1. In some embodiments, the at least one compatibilizer precursor is present in the PMA formulation in a weight ratio of the at least one compatibilizer precursor to the asphalt of 1:20 to 1:1. In some embodiments, the at least one compatibilizer precursor is present in the PMA formulation in a weight ratio of the at least one compatibilizer precursor to the asphalt of 1:10 to 1:1. In some embodiments, the at least one compatibilizer precursor is present in the PMA formulation in a weight ratio of the at least one compatibilizer precursor to the asphalt of 1:5 to 1:1. In some embodiments, the at least one compatibilizer precursor is present in the PMA formulation in a weight ratio of the at least one compatibilizer precursor to the asphalt of 1:2 to 1:1.

In some embodiments, the at least one compatibilizer precursor is present in the PMA formulation in a weight ratio of the at least one compatibilizer precursor to the asphalt of 1:50 to 1:2. In some embodiments, the at least one compatibilizer precursor is present in the PMA formulation in a weight ratio of the at least one compatibilizer precursor to the asphalt of 1:50 to 1:10. In some embodiments, the at least one compatibilizer precursor is present in the PMA formulation in a weight ratio of the at least one compatibilizer precursor to the asphalt of 1:50 to 1:20.

In some embodiments, the at least one compatibilizer precursor is present in the PMA formulation in a weight ratio of the at least one compatibilizer precursor to the asphalt of 1:20 to 1:2. In some embodiments, the at least one compatibilizer precursor is present in the PMA formulation in a weight ratio of the at least one compatibilizer precursor to the asphalt of 1:10 to 1:5.

A non-limiting exemplary prototype of a compatibilizer precursor according to the present disclosure is shown in FIG. 1. As shown by FIG. 1, in some embodiments, the at least one compatibilizer precursor may take the form of a concentrate. In some embodiments, the concentrate may be a polymer concentrate comprising the at least one compatibilizer precursor and the at least one polymer described herein.

Figure 2:
FIGS. 2 and 3 depict non-limiting exemplary prototypes of a mat coated with a finished filled coating described herein.
Figure 3:

Non-limiting exemplary prototypes of a mat coated with a finished filled coating are shown in FIGS. 2 and 3. In some embodiments, the finished filled coating of FIG. 2 or 3 is prepared using the at least one compatibilizer precursor described herein. In some embodiments, the finished filled coating includes at least one filler described herein. In some embodiments, the finished filled coating is prepared by combining the at least one compatibilizer precursor described herein with asphalt. In some embodiments, the finished filled coating is prepared by combining the at least one compatibilizer precursor described herein with a non-asphaltic component. In some embodiments, the finished filled coating is prepared by combining the at least one compatibilizer precursor described herein with both an asphaltic and a non-asphaltic component.

Figure 4:
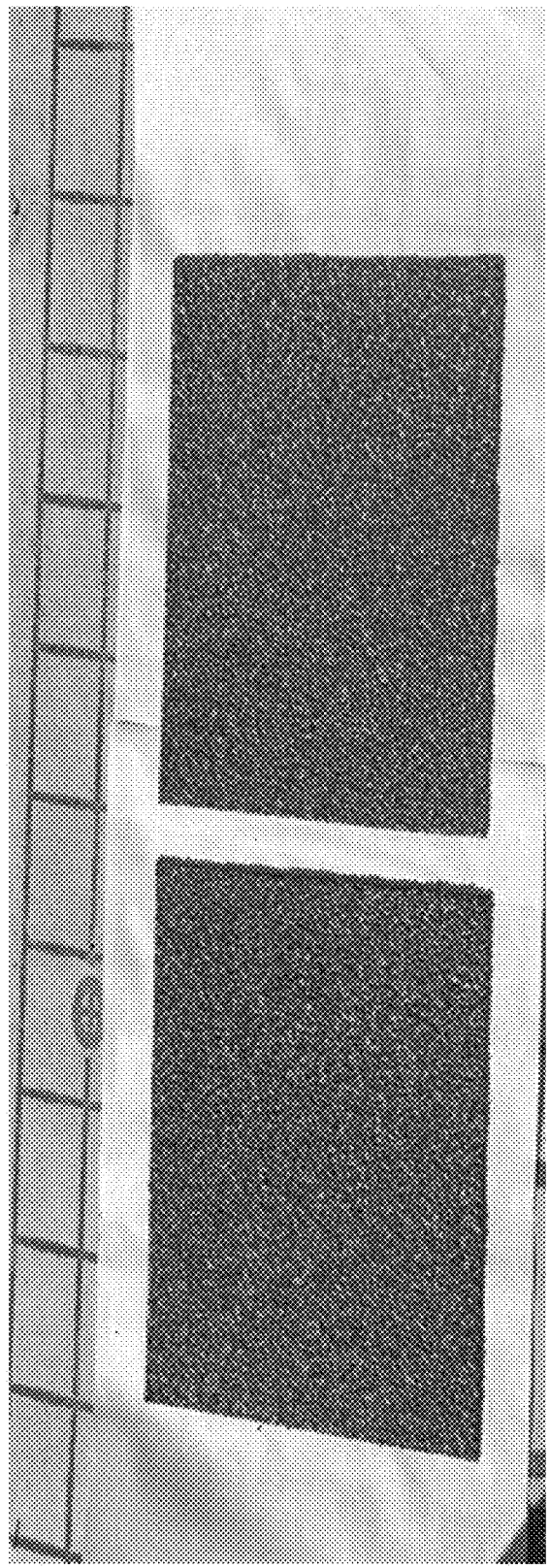
FIG. 4 depicts a non-limiting exemplary prototype of a shingle prepared with the finished filled coating described herein.

FIG. 4 depicts a non-limiting exemplary prototype of a shingle prepared with the finished filled coating described herein. In some embodiments, the shingle may be a roofing shingle.

EXAMPLES

Non-Limiting Example 1

Example filled coatings were prepared using the at least one compatibilizer precursor described herein. In the present non-limiting example, the at least one compatibilizer precursor took the form of concentrates A-E. In the present non-limiting example, each of concentrates A-E included specified amounts of a compatibilizer precursor in the form of an oil (i.e., Hydrolene® or Process Oil) and at least one polymer (i.e., Kraton™ SBS, Kraton™ SEBS, or a combination of recycled polyvinyl butyral "PVB" and Rextac® 2304 polyalphaolefin). Each of concentrates A-D were combined with asphalt (Asphalt K-M) to form Polymer Modified Asphalt ("PMA") formulations I-IV. PMA formulation V was also formed, as indicated in Table 1 below. PMA formulations I-V were combined with specified amounts of filler to form filled coatings (Filled coatings 1-5).

In one embodiment of the present example, a PAA wax additive described herein was added. In another embodiment of the present example, additives in the form of transoctenamer rubber (TOR) and a propylene-based elastomer (Vistamaxx™) were added.

Several properties (i.e., softening point, viscosity, and penetration point "PEN") were tested. Polymer concentrates A, B, D, and, E were formed, mixed with the base asphalt, and mixed with the filler using a "high shear mixer" manufactured by Silverson®. Polymer concentrate C was formed, mixed with the base asphalt, and mixed with the filler using a continuous "high shear mixer" manufactured by Readco. All mixing times ranged from 3 minutes to 90 minutes.

Results of the tests shown in Table 1 below.

TABLE 1

Non-limiting properties of certain concentrates, asphalts, polymer modified asphalt formulations, and filled coatings:

| Material | Softening Point (° F.) ASTM D36 | Viscosity at 400° F. (cP) | PEN (dmm) at 77° F. ASTM D5 |
|---|---|---|---|
| Polymer Concentrate A (80% Hydrolene H600T/20% Kraton SBS D1191ET) | 242 | 2474 | 120 |
| Base Asphalt K | 210 | 296 | 15 |
| Polymer Modified Asphalt ("PMA") 1-90.0% Base Asphalt K/10.0% Concentrate A = Formulation I | 211 | 349 | 18 |
| PMA Filled coating 1 (35% Formulation I/65% filler) | 243 | 3108 | 8 |
| Polymer Concentrate B (74.5% Hydrolene H600T/24.5% Kraton SBS D1191ET) | 263 | 6208 | 107 |
| Base Asphalt L | 177 | 123 | 2.3 |
| PMA 2-73.5% Base Asphalt L/26.5% Concentrate B = Formulation II | 225 | 302 | 18 |
| PMA Filled coating 2 (Formulation II + 67% filler) | 245 | 2212 | 9.3 |
| Polymer Concentrate C (70% Hydrolene H600T/30% Kraton SBS D1191ET) | >320 | Not measured | 101 |
| Asphalt M | 160 | 67 | 5 |
| PMA 3-78.5% Asphalt M/21.5% Concentrate C = Formulation III | 218 | 251 | 20 |
| Filled coating 3 (Formulation III + 66% filler) | 251 | 1978 | 9 |
| Polymer Concentrate D (50% Hydrolene H90T/50% Kraton SEBS G1642) | 280.2 | 58388 | 33.3 |
| Asphalt N | 169 | 153 | 15 |
| PMA 4-91.0% Asphalt N/8.0% Concentrate D/1.0% PAA wax = Formulation IV | 206 | 305 | 17.3 |
| PMA Filled coating 4 (Formulation IV + 65% filler) | 235.1 | 3984 | 7.7 |
| Polymer Concentrate E (30.6% H600T/33.8% Rextac® 2304/8.8% Vistamaxx™ 6102/4.4% TOR 8012/22.4% recycled PVB | Not measured | Not measured | Not measured |
| Process Oil H600T O | Liquid at room temperature | | |
| PMA 5-- 13.6% Process Oil H600T O/86.4% Concentrate E = Formulation V | 275 | 1357 | 60 |
| PMA Filled coating 5 (Formulation V + 63% filler) | 282 | 10750 | 32 |

Comparative Example 1

Asphalt P was combined with the same polymer (Kraton SBS D1191ET) of polymer concentrates A, B, and C, so as to form a comparative polymer modified asphalt (PMA) formulation. The same high shear mixer (manufactured by Silverson®) used to form polymer concentrates A, B, D, and, E was used to form the comparative PMA formulation. However, in the present comparative example, no compatibilizer precursor was used.

Mixing time for mixing the asphalt with the polymer without the compatibilizer precursor, exceeded 150 minutes.

Several properties (i.e., softening point, viscosity, and penetration point "PEN") of both the base asphalt and the comparative PMA formulation were tested. Results are shown below in Table 2.

TABLE 2

Non-limiting properties of asphalt and a comparative polymer modified asphalt (PMA) formulation

| Material | Softening Point (° F.) ASTM D36 | Viscosity at 400° F. (cP) | PEN (dmm) at 77° F. ASTM D5 |
|---|---|---|---|
| Base Asphalt P | 209.6 | 250 | 14 |
| Comparative PMA--97% Asphalt P/3% Kraton SBS D1191ET | 212 | 340 | 11 |

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

As used herein, the term "consisting essentially of" limits the scope of a specific claim to the specified materials or steps and those that do not materially affect the basic and novel characteristic or characteristics of the specific claim. In some embodiments, a claim reciting "consisting essentially of" may allow for the addition of any unrecited component that does not materially affect at least one of the following: softening point of at least one component or combination of components, penetration point of at least one component or combination of components, elongation of at least one component or combination of components, or any combination thereof. In some embodiments, a claim reciting "consisting essentially of" may allow for the addition of at least one additive, at least one filler, or any combination thereof.

The disclosure described herein may be practiced in the absence of any element or elements, limitation or limitations, which is not specifically disclosed herein. Thus, for example, in each instance herein, any of the terms "comprising," "consisting essentially of and "consisting of" may be replaced with either of the other two terms. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A roofing material comprising:
   (a) a substrate; and
   (b) a coating applied onto the substrate, the coating comprising:
      (i) at least one polymer;
      (ii) at least one compatibilizer precursor,
         wherein the at least one compatibilizer precursor comprises at least one paraffinic oil, at least one petroleum extract, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), or any combination thereof; and
      (iii) asphalt;
   wherein the coating is a polymer modified asphalt (PMA) coating.

2. The roofing material according to claim 1, wherein the at least one polymer is present in the coating in a weight ratio of the at least one polymer to the asphalt of 1:100 to 1:2.

3. The roofing material according to claim 1, wherein the at least one compatibilizer precursor is present in the coating in a weight ratio of the at least one compatibilizer precursor to the asphalt of 1:50 to 1:1.

4. The roofing material according to claim 1, wherein the at least one compatibilizer precursor comprises at least one resin, at least one process oil, or any combination thereof.

5. The roofing material according to claim 4, wherein the at least one resin comprises least one terpene resin, at least one petroleum resin, at least one hydrogenated rosin, at least one rosin milk, at least one petroleum resin emulsion, at least one terpene-phenolic resin, at least one hydrogenated petroleum resin, at least one aliphatic hydrocarbon resin, at least one hydrogenated aliphatic hydrocarbon resin, at least one aromatic modified aliphatic hydrocarbon resin, at least one hydrogenated aromatic modified aliphatic hydrocarbon resin, at least one polycyclopentadiene resin, at least one hydrogenated polycyclopentadiene resin, at least one cycloaliphatic hydrocarbon resin, at least one hydrogenated cycloaliphatic resin, cycloaliphatic/aromatic hydrocarbon resin, at least one hydrogenated cycloaliphatic/aromatic hydrocarbon resin, hydrogenated aromatic hydrocarbon resin, at least one maleic acid/anhydride modified tackifier, terpene modified aromatic and/or aliphatic hydrocarbon resin, at least one hydrogenated terpene modified aromatic and/or aliphatic hydrocarbon resin, at least one polyterpene resin, at least one hydrogenated polyterpene resin, at least one aromatic modified polyterpene resin, at least one hydrogenated aromatic modified polyterpene resin, at least one terpene-phenol resin, at least one hydrogenated terpene-phenol resin, at least one gum rosin resin, at least one hydrogenated gum rosin resin, at least one gum rosin ester resin, at least one wood rosin resin, at least one hydrogenated wood rosin resin, at least one rosin acid resin, at least one hydrogenated rosin acid resin, or any combination thereof.

6. The roofing material according to claim 1, wherein the at least one polymer comprises at least one polyolefin, oxidized polyethylene (OPE), polyethylene-polypropylene elastomer, ground tire rubber (GTR), isotactic polypropylene (IPP), atactic polypropylene (APP), styrene-butadiene-styrene (SBS) copolymer, a styrene-ethylene-butylene-styrene (SEBS) copolymer, polyvinyl butyral (PVB) or any combination thereof.

7. The roofing material according to claim 1, wherein the coating further comprises at least one filler, at least one additive, or any combination thereof.

8. The roofing material according to claim 7, wherein the at least one filler, the at least one additive, or combination thereof, comprises transoctenamer rubber (TOR) a propylene-based elastomer, at least one wax, calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, or any combination thereof.

9. The roofing material according to claim 7, wherein the coating has a softening point of at least 200° F. as measured according to ASTM D36.

10. The roofing material according to claim 7, wherein the coating has a softening point of 200° F. to 320° F. as measured according to ASTM D36.

11. The roofing material according to claim 7, wherein the coating has a penetration point ("PEN") of at least 5 dmm as measured according to ASTM D5.

12. The roofing material according to claim 7, wherein the coating has a penetration point ("PEN") of 5 dmm to 40 dmm as measured according to ASTM D5.

13. The roofing material according to claim 1, wherein the substrate comprises one of a glass mat or a fiberglass mat.

14. The roofing material according to claim 1, wherein the roofing material is a roofing shingle.

15. The roofing material according to claim 1, further comprising granules.

16. A method of making a roofing material comprising:
   (a) mixing at least one compatibilizer precursor with at least one polymer, so as to result in a polymer concentrate,
      wherein the at least one compatibilizer precursor comprises at least one paraffinic oil, at least one petroleum extract, at least one naphthenic oil, at least one aromatic oil, at least one re-refined engine oil bottom (REOB), at least one engine oil residue (EOR), at least one re-refined heavy vacuum distillation bottom (RHVDB), at least one re-refined heavy vacuum distillation oil (RHVDO), at least one re-refined vacuum tower bottom (RVTB), at least one vacuum tower bottom (VTB), or any combination thereof, (b) mixing the polymer concentrate with asphalt in a mixer to form a polymer modified asphalt ("PMA") coating; and (c) applying the PMA coating to a substrate to form a roofing material.

17. The method according to claim 16, wherein the at least one polymer is mixed with the at least one compatibilizer precursor in a weight ratio of the at least one polymer to the at least one compatibilizer precursor of 1:100 to 2:1.

18. The method according to claim 16, wherein the polymer concentrate is mixed with the asphalt in a weight ratio of the polymer concentrate to the asphalt of 1:50 to 1:1.

19. The method according to claim 16, wherein the at least one compatibilizer precursor comprises at least one resin, at least one process oil, or any combination thereof.

20. The method according to claim 19, wherein the at least one resin comprises least one terpene resin, at least one petroleum resin, at least one hydrogenated rosin, at least one rosin milk, at least one petroleum resin emulsion, at least one terpene-phenolic resin, at least one hydrogenated petroleum resin, at least one aliphatic hydrocarbon resin, at least one hydrogenated aliphatic hydrocarbon resin, at least one aromatic modified aliphatic hydrocarbon resin, at least one hydrogenated aromatic modified aliphatic hydrocarbon resin, at least one polycyclopentadiene resin, at least one hydrogenated polycyclopentadiene resin, at least one cycloaliphatic hydrocarbon resin, at least one hydrogenated cycloaliphatic resin, cycloaliphatic/aromatic hydrocarbon resin, at least one hydrogenated cycloaliphatic/aromatic hydrocarbon resin, hydrogenated aromatic hydrocarbon resin, at least one maleic acid/anhydride modified tackifier, terpene modified aromatic and/or aliphatic hydrocarbon resin, at least one hydrogenated terpene modified aromatic and/or aliphatic hydrocarbon resin, at least one polyterpene resin, at least one hydrogenated polyterpene resin, at least one aromatic modified polyterpene resin, at least one hydrogenated aromatic modified polyterpene resin, at least one terpene-phenol resin, at least one hydrogenated terpene-phenol resin, at least one gum rosin resin, at least one hydrogenated gum rosin resin, at least one gum rosin ester resin, at least one wood rosin resin, at least one hydrogenated wood rosin resin, at least one rosin acid resin, at least one hydrogenated rosin acid resin, or any combination thereof.

21. The method according to claim 16, wherein the at least one polymer comprises at least one polyolefin, oxidized polyethylene (OPE), polyethylene-polypropylene elastomer, ground tire rubber (GTR), isotactic polypropylene (IPP), atactic polypropylene (APP), styrene-butadiene-styrene (SBS) copolymer, a styrene-ethylene-butylene-styrene (SEBS) copolymer, polyvinyl butyral (PVB), or any combination thereof.

22. The method according to claim 16, further comprising adding at least one filler, at least one additive, or any combination thereof to the polymer modified asphalt, so as to result in a filled polymer modified asphalt ("PMA") coating.

23. The method according to claim 22, wherein the at least one filler, the at least one additive, or combination thereof, comprises transoctenamer rubber (TOR) a propylene-based elastomer, at least one wax, calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, ammonium polyphosphate, graphite, or any combination thereof.

24. The method according to claim 16, wherein the substrate comprises one of a glass mat or a fiberglass mat.

25. The method according to claim 16, wherein the roofing material is a roofing shingle.

26. The method according to claim 16, further comprising adding granules to the substrate after the applying of the PMA coating to the substrate.

27. The method according to claim 16, wherein mixing the at least one compatibilizer precursor with the at least one polymer is performed over a time period of 3 minutes to 90 minutes.

28. The method according to claim 16, wherein mixing the polymer concentrate with asphalt is performed over a time period of 45 minutes to 90 minutes.

* * * * *